United States Patent [19]

Dell

[11] 4,167,419

[45] Sep. 11, 1979

[54] MIX SUITABLE FOR USE IN SEAMS BETWEEN CARBON BLOCKS

[75] Inventor: M. Benjamin Dell, Pittsburgh, Pa.

[73] Assignee: Aluminum Company of America, Pittsburgh, Pa.

[21] Appl. No.: 449,592

[22] Filed: Mar. 11, 1974

[51] Int. Cl.$^2$ .............................................. C08L 95/00
[52] U.S. Cl. .................................................... 106/284
[58] Field of Search .................... 204/67, 294, 67, 297; 252/502, 510, 511; 106/38.8, 56, 280, 281, 284, 285; 264/29

[56] References Cited

U.S. PATENT DOCUMENTS

| | | | |
|---|---|---|---|
| 2,637,072 | 5/1953 | Greaves et al. | 264/29 |
| 2,888,357 | 5/1959 | Pittman et al. | 106/278 X |
| 2,903,374 | 9/1959 | Ramse et al. | 252/502 X |
| 3,035,932 | 5/1962 | McNamara et al. | 204/294 X |
| 3,072,558 | 1/1963 | Myers et al. | 204/294 X |
| 3,171,816 | 3/1965 | Peter et al. | 106/56 X |
| 3,187,089 | 6/1965 | Cosby et al. | 204/294 X |
| 3,241,984 | 3/1966 | King et al. | 106/38.8 |

OTHER PUBLICATIONS

Abraham, Asphalts and Allied Substances, 6th ed., vol. 2, D. Van Nostrand Co., N.J. pp. 5, 8, 90, 94.

Primary Examiner—Theodore Morris
Attorney, Agent, or Firm—Daniel A. Sullivan, Jr.

[57] ABSTRACT

A mix suitable for use as seam mix in an electrolytic cell for producing aluminum, of the type which has conventionally consisted essentially of carbon aggregate and binder and which has been heated for the purpose of obtaining sufficient workability to enable a tamping operation to product liquid-tight and electrically conductive seams, wherein the improvement includes the presence of a solvent having a boiling point of from 150° to 350° C. and consisting essentially of at least one compound selected from the group consisting of aromatic hydrocarbons having only saturated side chains, the solvent being present in an amount sufficient to render the mix capable of being tamped without the application of heat.

3 Claims, No Drawings

MIX SUITABLE FOR USE IN SEAMS BETWEEN CARBON BLOCKS

BACKGROUND OF THE INVENTION

The present invention relates to an improved mix of carbon aggregate and binder. More particularly, it relates to a seam mix useful for forming fluid-tight, electrically conductive seams between carbon blocks in the bottom of a Hall-Heroult cell for producing aluminum metal by the electrolysis of $Al_2O_3$.

Background material on the technique of using seam mixes in the construction of Hall-Heroult cells is given in U.S. Pat. No. 2,378,142 issued June 12, 1945, to Hurter for a "Method For Making Furnaces For the Electrolytic Production of Aluminum" and in U.S. Pat. No. 3,576,700 issued Apr. 27, 1971, to M. B. Dell for "High Strength Joined Porous Block Structure and Method of Making Same". The seams are referred to in the Hurter patent as "interspaces".

According to a present method of seam mix usage in the construction of Hall-Heroult cells, prebaked cathode blocks of carbon are arranged in a cell bottom, separated by seams 1 to 3 inches wide. To obtain optimum properties, e.g. high density, in the seam, conventional practice has been to preheat the carbon blocks to 60° to 130° C., with hot, for example 130° C., seam mix then being incrementally tamped into the seams and between the cell side lining and the blocks to provide a smooth cell bottom.

This practice is disadvantageous for a number of reasons. Fumes are evolved from the heated mix. Considerable manpower and co-ordination are needed to achieve the placement of the hot seam mix between the heated blocks before the mix has had a chance to cool. The elevated temperatures mean discomfort for the people performing the work. And, significant capital and operating costs are associated with the preheating of both the blocks and the seam mix.

SUMMARY OF THE INVENTION

In view of the problems which have been associated with seam mixes typified by application at elevated temperatures, it is an object of the present invention to provide a mix which can be applied without the application of any heat, the temperature of the mix during application being simply that of the room in which the aluminum-producing cell or other device is located.

This, as well as other objects which will become apparent in the discussion that follows, are achieved, according to the present invention by providing a mix suitable for use as a seam mix in an electrolytic cell for producing aluminum, of the type which has conventionally consisted essentially of carbon aggregate and binder and which has been heated for the purpose of obtaining sufficient workability to enable a tamping operation to produce liquid-tight and electrically conductive seams, wherein the improvement includes the presence of a solvent having a boiling point of from 150° to 350° C. and consisting essentially of at least one compound selected from the group consisting of aromatic hydrocarbons having only saturated side chains, the solvent being present in an amount sufficient to render the mix capable of being tamped without the application of heat.

In a variation of the invention, the boiling point of the solvent is from 200° to 300° C.

As used herein, the term binder includes pitch obtained from coal tar and the similar products obtained from petroleum. The term "saturated side chains" is meant to include (1) not only the radicals conventionally falling under that term, such as methyl and ethyl radicals, but also (2) the hydrogen atom alone.

The solvent may contain impurities such as those which occur when manufacture is by coal tar distillation, such impurities including sulfur compounds such as thiophene, oxygen compounds such as phenols, and nitrogen compounds, both ring and side-chain nitrogen compounds, such as pyridine and amino benzene.

DESCRIPTION OF THE PREFERRED EMBODIMENTS

I have discovered that a very serviceable seam mix, capable of being applied at room temperature, can be produced, if a seam mix, which gives good service provided it is applied hot, is modified to contain an amount of crude methyl naphthalene solvent sufficient to make it capable of application at room temperature. As used herein, and unless indicated otherwise, the term "crude methyl naphthalene solvent" is defined as essentially, in weight-%, 12% ± 5% naphthalene,
55% ± 5% alpha and beta methyl naphthalene,
33% ± 5% dimethyl naphthalene, where the sum of the percentages of naphthalene, alpha and beta methyl naphthalene, and dimethyl naphthalene is essentially 100%. Such crude methyl naphthalene solvent can, of course, be prepared by mixing measured amounts of its component chemicals, but its cheaper source is in the form of a distillate fraction from the chemical oil derived from coke-oven tar. See, for example, Chapter 5 entitled "Recovery of Coal Chemicals" in *The Making, Shaping and Treating of Steel* published by United States Steel Corporation, 7th edition (1957), or Chapter 12 entitled "Coal Tar" in *Coal, Coke, and Coal Chemicals* by Philip J. Wilson, Jr., et al, published by the McGraw-Hill Book Company, Inc., First Edition (1950).

In preparing the mix of the present invention, I first assemble the ingredients of a conventional hot-application mix. These ingredients will be essentially carbon aggregate as one part and binder as the other. The binder is usually coke-oven pitch, but it may be petroleum binder.

My next step is to mix the binder and crude methyl naphthalene solvent together. The mixed binder and solvent is then poured into an unheated mixer which already has the carbon aggregate in motion. The mixing is continued until a uniform coating of the carbon aggregate with the binder-solvent combination has been obtained.

The binder component occurring in conventional hot-application seam mixes is, for example, the residue (called "pitch") of coal tar distillation, the technology of which is discussed in the above-mentioned chapters in *The Making, Shaping and Treating of Steel* and in *Coal, Coke, and Coal Chemicals*. Pitches are characterized by their "softening point", which parameter is determined by the "cube-in-air" method described in ASTM D-2319 entitled "Softening Point of Pitches".

The carbon aggregate is typically anthracite which has been calcined to drive-off its volatiles.

A preferred mix composition according to the present invention consists essentially of (1) 7 to 17 weight-percent binder of softening point of 48 to 54° C. and carbon aggregate at a weight-percent of quantity 100 minus the weight-percent of binder, and (2) crude methyl naphthalene solvent at 8 to 16%, more preferably 10 to 14%, of the weight of the binder.

The relationships in this preferred mix composition may be alternatively expressed mathematically as follows: Where X is the weight of binder and Y is the weight of aggregate, the quantity $$\frac{X}{X+Y} \cdot 100$$

may range between 7 and 17%, while the percentage of aggregate may range between $$100 \left(1 - \frac{X}{X+Y}\right),$$

with the amount of solvent ranging from 8 to 16% of X.

Further illustrative of the present invention are the following examples:

EXAMPLE I

A mix according to the invention was used to repair a "pot hole" in a Hall-Heroult cell which appeared to have reached its service life, so that relining would soon be necessary. The pot hole was a hole between cathode blocks where the original seam had eroded away, so that metal was tapping out of the cell. The cell was emptied of its liquid contents and allowed to cool down. The metal which solidified in the pot hole was dug out. The dug-out location was filled-in with seam mix of the present invention. The particular seam mix contained 88 weight-percent aggregate and 12 weight-percent pitch of about 50° C. softening point. This pitch was compounded by mixing 13.5 weight-% of 110° C. softening point pitch and 86.5 weight-% of 40° C. softening point pitch. The aggregate was calcined anthracite and had the particle size distribution given in Table I. In the table, "$-\frac{3}{8}+4$", for example, means particles which pass through a $\frac{3}{8}$ inch screen, Tyler series, and yet are retained on a No. 4 screen.

Table I.

| Calcined Anthracite Particle Size Distribution. | |
|---|---|
| Particle Size | Weight-% |
| $+\frac{3}{8}$ | 2.7 |
| $-\frac{3}{8}+4$ | 10.7 |
| $-4+8$ | 13.4 |
| $-8+14$ | 10.2 |
| $-14+28$ | 12.6 |
| $-28+48$ | 15.8 |
| $-48+100$ | 11.9 |
| $-100+200$ | 10.6 |
| Pan | 12.2 |

The pitch was heated to 75° C. and then a quantity of crude methyl naphthalene solvent equalling 10% of the weight of the pitch was stirred into the pitch. The particular crude methyl naphthalene solvent used was provided by the Koppers Company, Inc., of Pittsburgh, Pennsylvania under the designation "Methyl Naphthalene Fraction" which typically analyzes in weight-% as 12% naphthalene, 55% alpha and beta methyl naphthalene, and 33% dimethyl naphthalene. Additional specifications of this product are provided in Table II.

Table II.

| Additional Parameters for Exemplary Solvent. | |
|---|---|
| Parameter | Value |
| Distillation: 5% Point | Not below 232° C. |
| Distillation: 95% Point | Not below 255° C. |
| Specific Gravity at 15.5/15.5° C. | 1.010–1.030 |
| Tar Acids | 2.0% maximum |
| Tar Bases | 2.0% maximum |
| Water | 0.5% maximum |
| Flash Point Cleveland Closed Cup | 204° F. |

The aggregate was placed in a mixer, the mixer turned on, and, with the mixer blades in motion, the solvent-pitch mixture was added. Mixing was continued until the aggregate appeared to have a uniform distribution of the pitch-solvent mixture. No attempt was made to heat the mixer or the aggregate. The resulting mix was transported to the site of the Hall-Heroult cell which was to be repaired. Before tamping the mix into the pot hole, the sides of the pot hole were painted with a precoat of warmed pitch characterized by its having a softening point of 130° C. The seam mix was packed in successive layers into the dug-out pot hole using first a frame-mounted rammer and then a manual rammer for finishing the uppermost layer. With the seam mix well-tamped into the pot hole, the cell was placed on preheat for 8½ hours, using a two-burner flame heater. The temperature of the mix at the end of this time was 125° C., that temperature being reached at approximately 4 to 5 hours into the preheat time. The cell was started for the electrolysis of Al$_2$O$_3$ approximately 9 hours after the preheat had been terminated and was probed approximately 30 days after start-up. The probing indicated that the repair was still in good condition. The cell was operated at least over a ten-month period and showed no high iron content in the aluminum metal product. The presence of a high iron content would be an indication that the repair was leaking.

EXAMPLE II

In a mixer at room temperature, a mix was prepared using 13 weight-% pitch, softening point equals 52° C., and 87 weight-% aggregate and the crude methyl naphthalene solvent of Example I, present at 12% of the weight of the pitch. This mix was used as seam mix in the construction of a new aluminum-production cell. No precoat was placed on the carbon blocks. The carbon blocks were at room temperature, and the mix was tamped in also at room temperature. The room temperature was 25° C. While the simple preheat procedure described in Example 1 was sufficient for that particular cell, since it had already seen an extended period of operation, in this case of a new cell, the carbon blocks and the seam mix tamped between them were slowly heated in a substantially inert atmosphere for several hours to a temperature of 900 to 1000° C.

While the above examples use solvent at 10% and 12% of the weight of the pitch, baking-shrinkage tests show that solvent contents at from 8 to 16% of the weight of the pitch will provide successful room temperature seam mixes according to the invention.

The present invention has the particular advantage of permitting the use of pitches of higher softening point than previously commonly used in seam mixes, since now tamping can be carried out at room temperature. Increased softening point and concomitant higher coking value mean superior carbon bodies.

Besides being useful as a seam mix, the mix of the present invention, is its broader aspects, is suitable as a peripheral mix, i.e., as a mix for filling in around the array of carbon blocks in an aluminum production cell, and as a mix for producing a monolithic aluminum-production cell bottom, in which case no carbon blocks are used. The mix of the invention can be used both for new cell construction and for the repair of old cells. Additionally, it is not limited to application only in the aluminum industry; for example, it can, in its broader aspects, be applied generally in any application where it is required to produce high density, carbonaceous seams between carbon blocks in a structure.

It will be understood that the above description of the present invention is susceptible to various modifications, changes, and adaptations and the same are intended to be comprehended within the meaning and range of equivalents of the appended claims.

What is claimed is:
1. A mix suitable for use as seam mix in an electrolytic cell for producing aluminum, consisting essentially of
   (1) 7 to 17 weight-percent binder of softening point of 48 to 54° C. and carbon aggregate at a weight-percent of quantity 100 minus the weight-percent of binder, and
   (2) crude methyl naphthalene solvent at 8 to 16% of the weight of the binder.
2. A mix as claimed in claim 1, wherein the solvent is present at 10 to 14% of the weight of the binder.
3. A mix as claimed in claim 1, wherein the binder is pitch having a softening point of 50° C. and being present at 12 weight-percent, as based on the weight of the pitch plus aggregate, the aggregate is calcined anthracite and is present at 88 weight-percent, as based on the weight of the pitch plus aggregate, and the solvent is present at 10% of the weight of the pitch and consists essentially of, on a weight-percent basis, 12% naphthalene, 55% alpha and beta methyl naphthalene, and 33% dimethyl naphthalene.

* * * * *